(12) United States Patent
Kuroda et al.

(10) Patent No.: US 7,044,873 B2
(45) Date of Patent: May 16, 2006

(54) BELT-TYPE CONTINUOUSLY VARIABLE TRANSMISSION

(75) Inventors: Shojiro Kuroda, Fuji (JP); Yusuke Watabe, Fuji (JP)

(73) Assignee: Jatco LTD, Fuji (JP)

( * ) Notice: Subject to any disclaimer, the term of this patent is extended or adjusted under 35 U.S.C. 154(b) by 284 days.

(21) Appl. No.: 10/651,217

(22) Filed: Aug. 29, 2003

(65) Prior Publication Data

US 2004/0058760 A1    Mar. 25, 2004

(30) Foreign Application Priority Data

Sep. 4, 2002    (JP) .............................. 2002-258653

(51) Int. Cl.
*F16H 59/00*    (2006.01)
*F16H 55/56*    (2006.01)

(52) U.S. Cl. ............................................ 474/28; 38/46
(58) Field of Classification Search ................. 474/18, 474/28, 17, 69, 46, 39, 38; 477/45–48, 39
See application file for complete search history.

(56) References Cited

U.S. PATENT DOCUMENTS

| | | | |
|---|---|---|---|
| 4,560,369 A | | 12/1985 | Hattori |
| 5,031,481 A | * | 7/1991 | Algrain et al. ................ 477/45 |
| 6,110,062 A | * | 8/2000 | Fujikawa ...................... 474/28 |
| 6,461,271 B1 | * | 10/2002 | Nakano et al. ............... 477/39 |
| 6,749,530 B1 | * | 6/2004 | Okano et al. ................. 474/28 |

FOREIGN PATENT DOCUMENTS

| | | |
|---|---|---|
| EP | 0 318 635 A1 | 6/1989 |
| EP | 0 828 096 A2 | 3/1998 |
| EP | 0 896 171 A2 | 2/1999 |
| JP | 7-92124 B2 | 10/1995 |

* cited by examiner

*Primary Examiner*—Marcus Charles
(74) *Attorney, Agent, or Firm*—Foley & Lardner LLP

(57) ABSTRACT

A continuously variable transmission includes: (a) a drive pulley and a driven pulley in which the pulley width between a fixed disk and a movable disk may be varied in accordance with oil pressure, (b) a V-belt, which is wound around the drive pulley and driven pulley, and (c) a clutch for controlling the transmission of torque from an engine to the drive pulley. The continuously variable transmission further has a first spring for constantly urging the movable disk of the drive pulley to the fixed disk side and a second spring for constantly urging the movable disk of the driven pulley to the fixed disk side.

5 Claims, 5 Drawing Sheets

BELT-TYPE CONTINUOUSLY VARIABLE TRANSMISSION

FIELD OF THE INVENTION

This invention relates to a belt-type continuously variable transmission (belt CVT).

BACKGROUND OF THE INVENTION

In a vehicle which uses a belt-type continuously variable transmission, engine torque is transmitted through an input shaft to a drive pulley of the belt-type continuously variable transmission. The torque is transmitted through a metal belt from the drive pulley to a driven pulley and then transmitted through an output shaft and a differential gear from the driven pulley to a driving wheel. A clutch for controlling the transmission of torque to the driving wheel is typically positioned downstream of the transmission in respect of the flow of torque. By disengaging the clutch when the vehicle is towed while the driving wheel is in contact with a road surface, the rotation of the driving wheel is not transmitted to the transmission.

In one type of vehicle, however, the clutch is disposed between the engine and the belt-type continuously variable transmission. When this type of vehicle is towed, the clutch is disengaged, but input from the driving wheel is transmitted to the transmission. Typically, when a vehicle is towed, the gear ratio of the belt-type continuously variable transmission is set on the low side (here, "low side" means that the rotation speed of the driven pulley is low), and thus torque is input from the driving wheel side and the drive pulley of the belt-type continuously variable transmission rotates at high speed.

SUMMARY OF THE INVENTION

As disclosed in Japanese patent No. H7-92124, issued Oct. 9, 1995, an offset dX between a median plane of a groove in a drive pulley and a median plane of a groove in a driven pulley (in other words, an amount of misalignment) is set at zero when the gear ratio is on the top side. Hence when the gear ratio is on the low side, the offset dX is large. When the vehicle is towed with the gear ratio on the low side, the drive pulley rotates at high speed and further a side face of the metal belt protrudes from the pulley groove. As a result, durability may decrease due to friction between the metal belt and pulley.

An object of this invention is to provide a belt-type continuously variable transmission system for preventing the decrease of the durability caused by friction between a metal belt and a pulley when a vehicle is towed.

In order to achieve above object, this invention provides a belt-type continuously variable transmission system for use in a vehicle, the system has a belt-type continuously variable transmission provided with a drive pulley and a driven pulley each having a fixed disk and a movable disk disposed opposing the fixed disk to form a V-shaped pulley groove, the width of each pulley groove being variable in accordance with oil pressure applied to the movable disks, a V-belt being fitted into each pulley groove and wound around the drive pulley and driven pulley, and a gear ratio being set in accordance with the width of the pulley groove in the drive pulley and driven pulley. The system further has an oil pressure supply device for supplying oil pressure to each movable disk and a clutch for controlling the transmission of torque from an engine of the vehicle to the drive pulley. The belt-type continuously variable transmission comprises a first spring for applying an urging force to the movable disk of the drive pulley to urge the movable disk to the corresponding fixed disk side; and a second spring for applying an urging force to the movable disk of the driven pulley to urge the movable disk to the corresponding fixed disk side. The first spring sets the pulley width of the drive pulley and the second spring sets the pulley width of the driven pulley when the oil pressure supply device is inoperative.

The details as well as other features and advantages of this invention are set forth in the remainder of the specification and are shown in the accompanying drawings.

DESCRIPTION OF THE PREFERRED EMBODIMENTS

Figure 1:
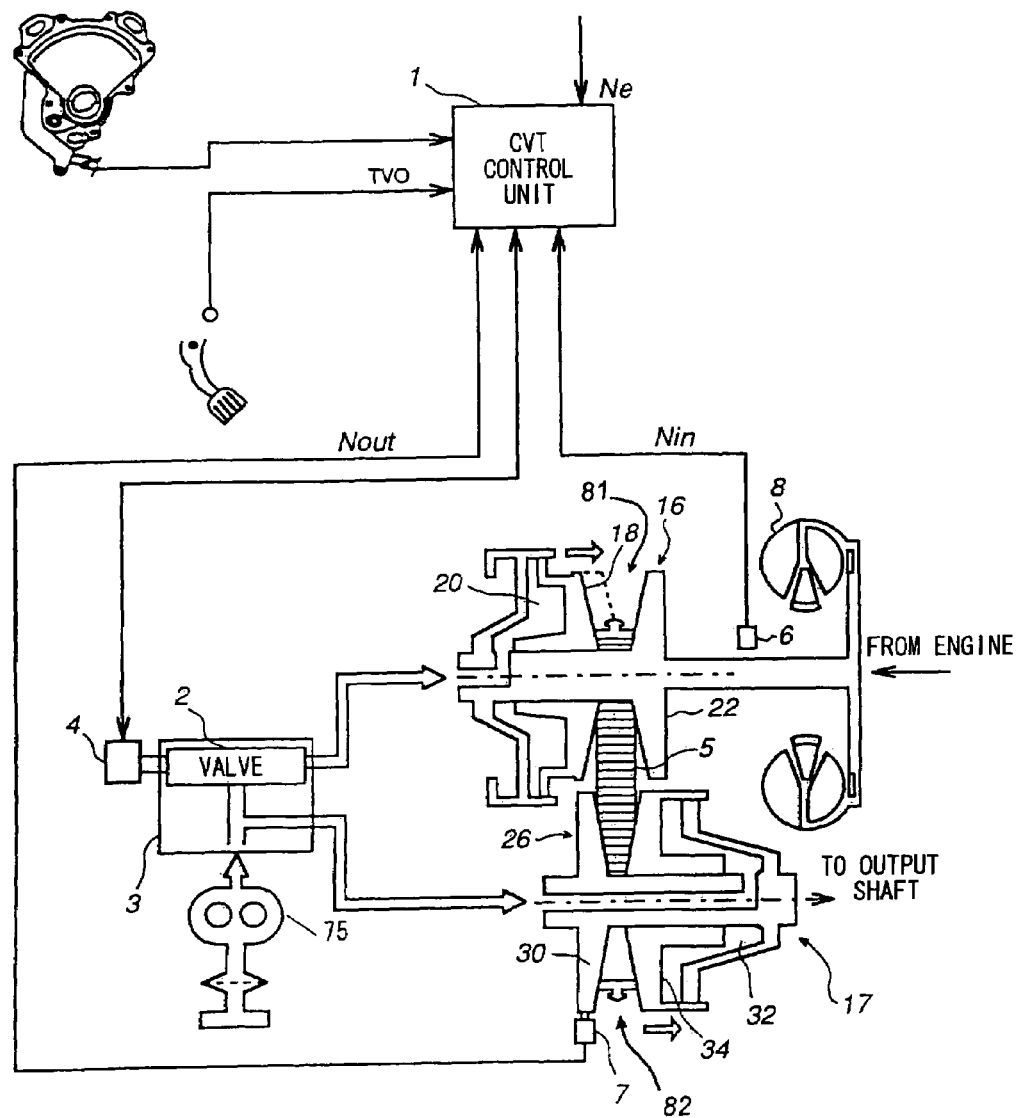
FIG. 1 is a schematic diagram of a continuously variable transmission according to an embodiment of this invention.

Referring to FIG. 1, the constitution of a V-belt continuously variable transmission will be described. A continuously variable transmission 17 comprises a drive pulley 16 to which torque is transmitted from an engine not shown in the drawing, and a driven pulley 26 which is connected to an output shaft. The drive pulley 16 and driven pulley 26 are variable pulleys having V-shaped pulley grooves 81, 82 with variable width. Here, the cross section of the pulley grooves 81, 82 along the radial direction of the pulley is V-shaped. A metallic V-belt 5 having a V-shaped cross section is wound around the drive pulley 16 and driven pulley 26, thereby interlocking the drive pulley 16 and driven pulley 26. The metallic V-belt 5 comprises a metal ring and metal elements supported by the metal ring. The metal elements come into contact with the surface of the pulley grooves 81, 82 and apply torque to the drive and driven pulleys 16, 26.

The drive pulley 16 comprises a fixed disk 22 which rotates integrally with an input shaft connected to the engine (not shown) and a movable disk 18 which is disposed opposing the fixed disk 22 to form a V-shaped pulley groove. The movable disk 18 is displaced in the direction of the rotary axis in accordance with oil pressure transmitted to a piston chamber 20 of the drive pulley from a gear ratio control valve 2.

The driven pulley 26 comprises a fixed disk 30 which rotates integrally with the output shaft and a movable disk 34 which is disposed opposing the fixed disk 30 to form a V-shaped pulley groove. The movable disk 34 is capable of displacement in the direction of the rotary axis in accordance with oil pressure transmitted to a piston chamber 32 of the driven pulley from an oil pressure control unit 3.

Gear ratio control for varying the width of the V-shaped pulley grooves of the drive pulley 16 and driven pulley 26 is performed by the gear ratio control valve 2 which adjusts the supply of oil to the piston chamber 20 of the drive pulley.

In other words, the gear ratio is controlled by a solenoid 4 serving as an actuator which responds to instructions from a CVT control unit 1 and the oil pressure control unit 3 comprising the gear ratio control valve 2 which is driven by the solenoid 4.

The oil pressure control unit 3 is supplied with line pressure from an oil pump 75, and thus the line pressure can be supplied to the driven pulley piston chamber 32 and the gear ratio control valve 2. The oil pump 75 and oil pressure control unit 3 constitute an oil pressure supply device for supplying oil pressure to the movable disks 18, 34. The oil pump 75 is driven by the rotation of the engine, and thus when the engine is inoperative, the supply of oil pressure to the driven pulley piston chamber 32 and drive pulley piston chamber 20 is halted.

The microcomputer-based CVT control unit 1 calculates a target gear ratio on the basis of the operating conditions of the vehicle such as engine rotation speed Ne and accelerator pedal pressure TVO, and controls the electric current flowing into the solenoid 4 such that the actual gear ratio coincides with the calculated target gear ratio. The actual gear ratio is calculated on the basis of signals from a rotation speed sensor 6 which detects a rotation speed Nin [rpm] of the input shaft or fixed disk 22 and a rotation speed sensor 7 which detects a rotation speed Nout [rpm] of the output shaft or fixed disk 30. In this description, the actual gear ratio is obtained as an output/input speed ratio Nout/Nin. The gear ratio is the inverse of the pulley ratio Rout/Rin, where Rin is the effective gear radius of the drive pulley 16 and Rout is the effective gear radius of the driven pulley 26. The higher the gear ratio, the higher the rotation speed of the output shaft is.

Figure 2:
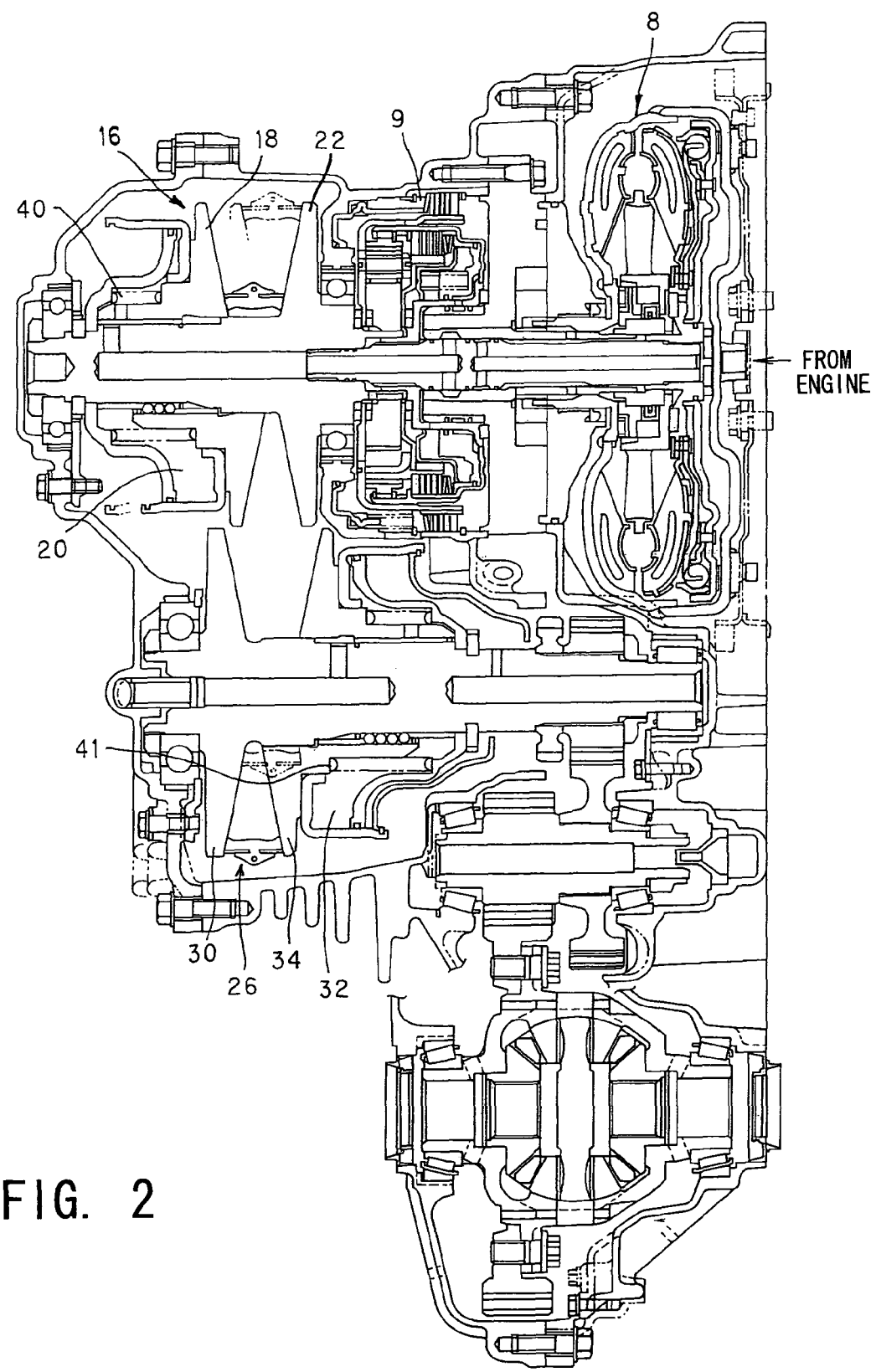
FIG. 2 is a detailed diagram of the same continuously variable transmission as in FIG. 1.

Referring to FIG. 2, the continuously variable transmission will be described in detail.

A clutch 9 for controlling the transmission of torque from a torque converter 8 to the continuously variable transmission 17 is disposed between the transmission 17 and the torque converter 8. The clutch 9 controls the transmission of torque from the engine to the drive pulley. The torque converter 8 transmits torque from the engine to the continuously variable transmission 17. When the vehicle is towed, the clutch 9 is disengaged, and hence torque is not transmitted from the drive pulley to the engine. Further, when the vehicle is towed, the engine is of course inoperative and therefore the oil pump 75 is not driven by the rotation of the engine.

The continuously variable transmission 17 comprises a first return spring 40 (that is, first urging means) for constantly urging the movable disk 18 of the drive pulley 16 to the fixed disk side thereof and a second return spring 41 (that is, second urging means) for constantly urging the movable disk 34 of the driven pulley 26 to the fixed disk side thereof. Other elastic bodies may be used in place of the first return spring 40 and second return spring 41.

The first return spring 40 disposed on the drive pulley 16 functions to narrow the pulley groove width of the drive pulley 16 to increase the gear ratio when no oil pressure is applied to the movable disk 18 of the drive pulley 16 due to the engine being halted. The second return spring 41 disposed on the driven pulley 26, on the other hand, functions to narrow the pulley groove width of the driven pulley 26 to reduce the gear ratio when no oil pressure is applied to the movable disk 34 of the driven pulley 26 due to the engine being halted.

Figure 2A:
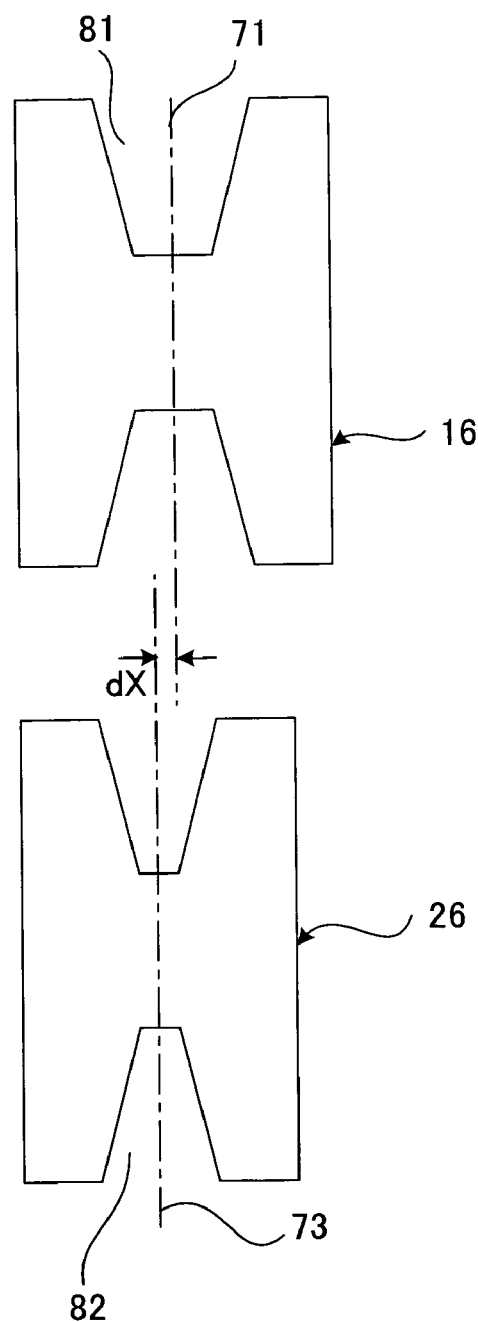
FIG. 2A is a schematic top view of the continuously variable transmission showing an offset dX.

In the prior art, the gear ratio is set on the low side by an action of the second return spring 41 when the engine is halted. In this invention, however, the gear ratio is set in accordance with the ratio of a spring constant of the first return spring 40 and a spring constant of the second return spring 41. This is because the positions of the movable disks 18, 34 are set by the balance between the urging forces of the first and second return springs 40, 41 which are applied to the metallic V-belt 5. Further, since the first return spring 40 is disposed on the drive pulley 16, the gear ratio is set on the high side when the engine is halted. If the vehicle is towed while the engine is halted, the gear ratio is set higher than a gear ratio which is set only by the second return spring 41. Thus the offset dX between the median plane 71 of the drive pulley groove and the median plane 73 of the driven pulley groove can be reduced such that abnormal contact between the metallic V-belt 5 and pulleys is suppressed. FIG. 2A illustrates the offset dX. As a result, the durability of the metallic V-belt 5 and the pulleys is improved.

Figure 3:
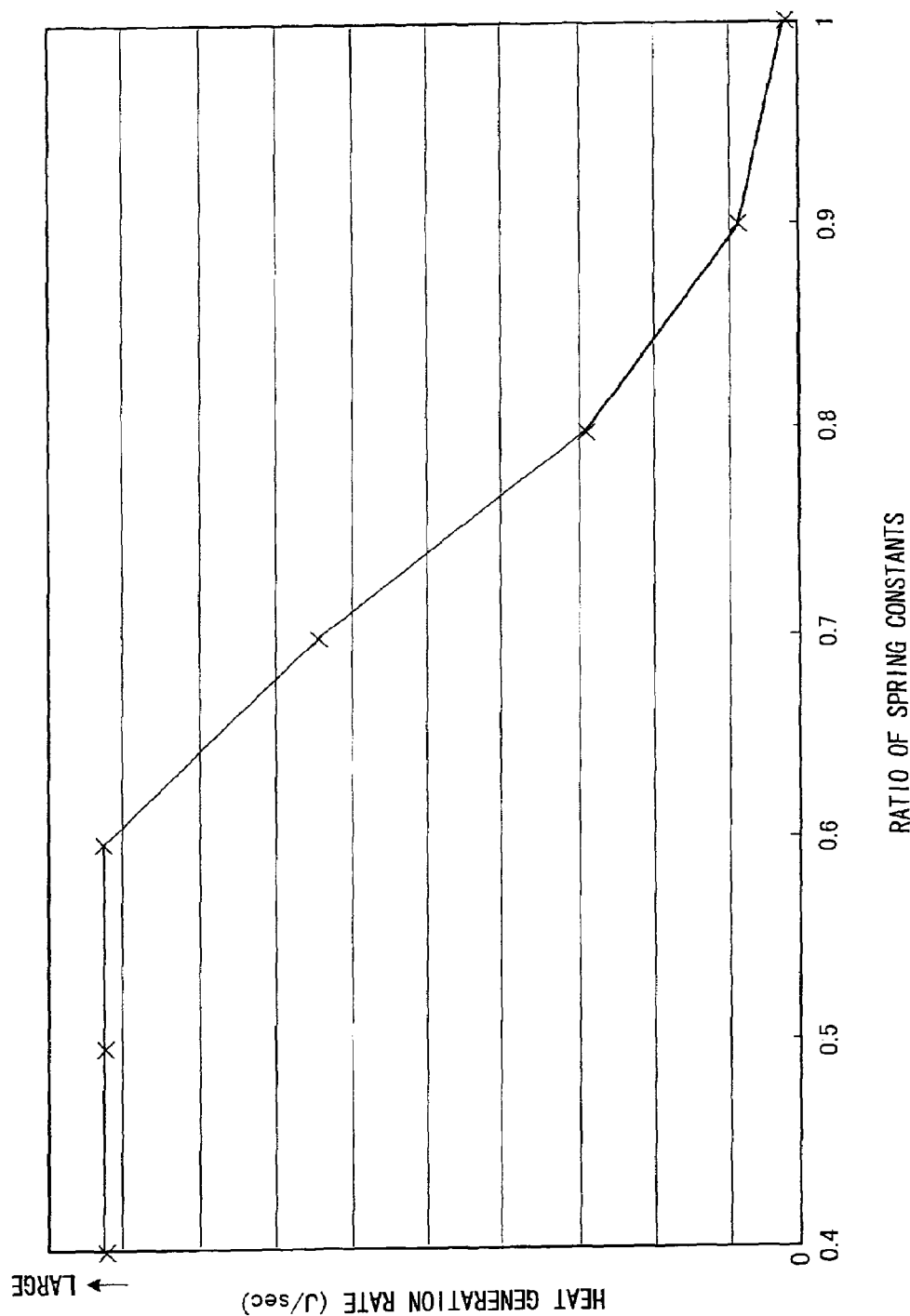
FIG. 3 is a graph showing a relationship between a ratio of the spring constants of two return springs and a heat generation rate.

FIG. 3 is a graph showing a relationship between the ratio of the spring constants of the first and second return springs 40, 41 and the heat generation rate in the CVT when the vehicle is towed. Here, the ratio of the spring constants is defined as (spring constant of the first return spring 40)/(spring constant of the second return spring 41). The heat generation rate is either a heat generation rate between the pulley and the metal element of the metallic V-belt 5 or a heat generation rate between the metal element of the metallic V-belt 5 and the metal ring of the metallic V-belt 5, for example. As shown in the drawing, the heat generation rate tends to decrease as the spring constant ratio increases. The relationship shown in FIG. 3 is obtained in advance through experiment or the like, for example, and accordingly the spring constant ratio of the return springs can be adjusted so that the heat generation rate falls within a predetermined rate. The predetermined rate may be a maximum allowable heat generation rate.

Further, by setting the spring constant ratio of the first and second return springs 40, 41 at a predetermined value, the offset dX between the pulleys can be set to substantially zero. (In actuality, the offset has a ±15% tolerance in consideration of setting errors, pulley rotation, and so on). As a result, the durability of the metallic V-belt 5 and pulleys is improved.

Figure 4:
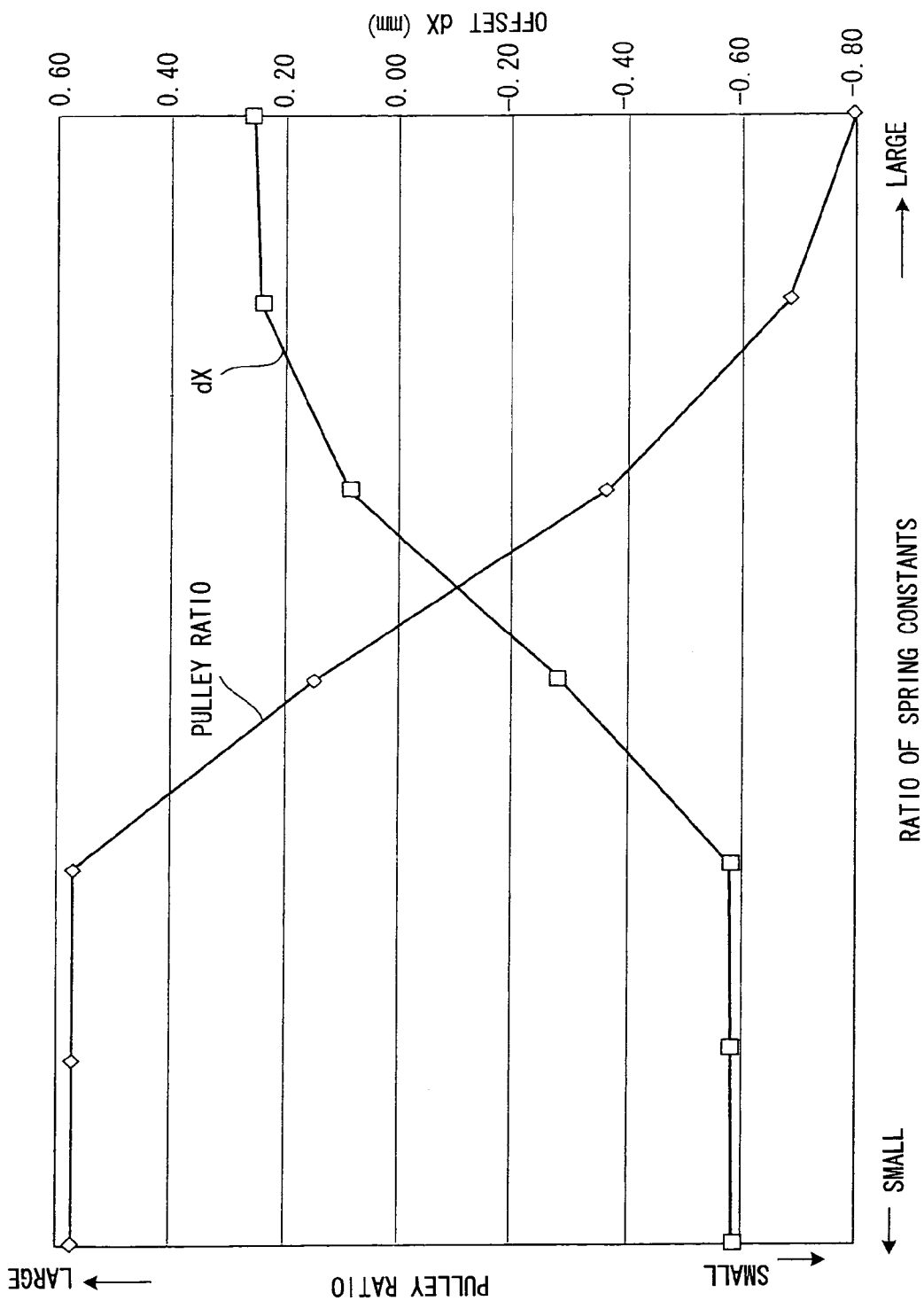
FIG. 4 is a graph showing a relationship between the ratio of the spring constants of the two return springs and the offset dX, and a relationship between the ratio of the spring constants of the two return springs and a pulley ratio.

FIG. 4 shows an example of a relationship between the spring constant ratio of the return springs and the offset dX. FIG. 4 also shows a relationship between the spring constant ratio of the return springs and the pulley ratio. The pulley ratio decreases as the spring constant ratio increases. These relationships are determined in advance through experiment or the like and thus the spring constants of the first and second return springs are set such that the offset dX is substantially zero.

Hence the spring constant ratio of the first and second return springs 40, 41 is set to satisfy the condition of the offset dX being zero. As a result, the durability of the V-belt and pulleys can be improved.

The entire contents of Japanese Patent Application P2002-258653 (filed Sep. 4, 2002) is incorporated herein by reference.

Modifications and variations of the embodiments described above will occur to those skilled in the art, in light of the above teachings. The scope of the invention is defined with reference to the following claims.

What is claimed is:

1. A continuously variable transmission system for use in a vehicle, the system comprising:
a continuously variable transmission comprising:
a drive pulley, which has a fixed disk and a movable disk disposed opposing the fixed disk to form a V-shaped pulley grove;
a drive pulley, which has a fixed disk and a movable disk disposed opposing the fixed disk to form a V-shaped pulley groove,
a V-belt that is fitted into each pulley groove and wound around the drive pulley and driven pulley;
a first spring for applying an urging force to the movable disk of the drive pulley to urge the movable disk to the corresponding fixed disk side; and
a second spring for applying an urging force to the movable disk of the driven pulley to urge the movable disk to the corresponding fixed disk side;
an oil pressure supply device for supplying oil pressure to each movable disk; and
a clutch for controlling the transmission of torque from an engine of the vehicle to the drive pulley,
wherein a width of each pulley groove is variable in accordance with oil pressure applied to the movable disks,
wherein a gear ratio is set in accordance with the widths of the pulley grooves in the drive pulley and driven pulley,
wherein the first spring sets the pulley width of the drive pulley and the second spring sets the pulley width of the driven pulley when the oil pressure supply device is inoperative, and
wherein a ratio of spring constants of the first spring and the second spring is set such that when the oil pressure supply device is inoperative, an offset between a median plane of the pulley groove in the drive pulley and a median plane of the pulley groove in the driven pulley is reduced.

2. The continuously variable transmission system as defined in claim 1, wherein the ratio of the spring constant of the first spring and the spring constant of the second spring is set such that when the oil pressure supply device is inoperative, the offset between the median plane of the pulley groove in the drive pulley and the median plane of the pulley groove in the driven pulley is substantially zero.

3. The continuously variable transmission system as defined in claim 1, wherein, when the oil pressure supply device is inoperative, the ratio of the spring constants of the first and second springs is set so that the gear ratio is high.

4. The continuously variable transmission system as defined in claim 1, wherein the oil pressure supply device comprises an oil pump and an oil pressure control unit.

5. A continuously variable transmission system for use in a vehicle, the system comprising:
a continuously variable transmission comprising:
a drive pulley, which has a fixed disk and a movable disk disposed opposing the fixed disk to form a V-shaped pulley groove;
a driven pulley, which has a fixed disk and a movable disk disposed opposing the fixed disk to form a V-shaped pulley grove,
a V-belt that is fitted into each pulley groove and wound around the drive pulley and driven pulley;
first urging means for applying an urging force to the movable disk of the drive pulley to urge the movable disk to the corresponding fixed disk side; and
second urging means for applying an urging force to the movable disk of the driven pulley to urge the movable disk to the corresponding fixed disk side;
an oil pressure supply device for supplying oil pressure to each movable disk; and
a clutch for controlling the transmission of torque from an engine of the vehicle to the
drive pulley,
wherein a width of each pulley groove is variable in accordance with oil pressure applied to the movable disks,
wherein a gear ratio is set in accordance with the widths of the pulley grooves in the drive pulley and driven pulley,
wherein the first urging means sets the pulley width of the drive pulley and the second urging means sets the pulley width of the driven pulley when the oil pressure supply device is inoperative, and
wherein a ratio of spring constants of the first urging means and the second urging means is set such that when the oil pressure supply device is inoperative, an offset between a median plane of the pulley groove in the drive pulley and a median plane of the pulley groove in the driven pulley is reduced.

* * * * *